(12) United States Patent
Lucas et al.

(10) Patent No.: US 11,769,531 B1
(45) Date of Patent: Sep. 26, 2023

(54) CONTENT SYSTEM WITH USER-INPUT BASED VIDEO CONTENT GENERATION FEATURE

(71) Applicant: Roku, Inc., San Jose, CA (US)

(72) Inventors: Katie Lauren Lucas, Cambridge (GB);
Sunil Ramesh, Cupertino, CA (US);
Michael Cutter, Golden, CO (US);
Charles Brian Pinkerton, Boulder, CO (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/149,492

(22) Filed: Jan. 3, 2023

(51) Int. Cl.
| | |
|---|---|
| *G11B 27/031* | (2006.01) |
| *H04N 21/845* | (2011.01) |
| *H04N 21/466* | (2011.01) |
| *H04N 21/45* | (2011.01) |
| *H04N 21/475* | (2011.01) |

(52) U.S. Cl.
CPC ....... *G11B 27/031* (2013.01); *H04N 21/4532* (2013.01); *H04N 21/4667* (2013.01); *H04N 21/4755* (2013.01); *H04N 21/8456* (2013.01)

(58) Field of Classification Search
CPC ............ G11B 27/031; H04N 21/4532; H04N 21/4667; H04N 21/4755; H04N 21/8456
See application file for complete search history.

(56) References Cited

U.S. PATENT DOCUMENTS

| | | | |
|---|---|---|---|
| 2017/0110151 A1* | 4/2017 | Matias | G06V 20/41 |
| 2020/0213680 A1* | 7/2020 | Ingel | H04N 21/44008 |
| 2021/0185378 A1* | 6/2021 | Rajendran | H04N 21/4532 |
| 2021/0314675 A1* | 10/2021 | Wang | H04N 21/44008 |
| 2021/0409640 A1* | 12/2021 | Jiang | G11B 27/031 |
| 2022/0028425 A1* | 1/2022 | Kalish | G06F 16/7867 |

* cited by examiner

*Primary Examiner* — Sunghyoun Park
(74) *Attorney, Agent, or Firm* — McDonnell Boehnen Hulbert & Berghoff LLP (57) ABSTRACT

In one aspect, an example method includes (i) obtaining a first segment of video content; (ii) outputting for presentation, the obtained first segment; (iii) after outputting for presentation the obtained first segment, causing a user to be prompted for user-input data; (iv) receiving user-input data provided in response to the prompting; (v) using at least the received user-input data to synthetically generate a second segment of the video content, wherein the generated second segment is static, non-interactive content; and (vi) outputting for presentation, the generated second segment.

19 Claims, 9 Drawing Sheets

The next scene of the movie involves a turning point event that involves a valuable painting. Please select one of the options below to choose what type of painting it will be.

A) a painting of a landscape in the style of impressionism

B) a painting of a landscape in the style of photorealism

C) a painting in of a house in the style of impressionism

Figure 4

Training Data 500

| User-Input Data | User-Profile Data | Video Data (for Input Seg.) | Metadata | Video Data (for Output Seg.) |
|---|---|---|---|---|
| Painting of a landscape | Impressionism style | Video data for heist scene | Position data for artwork | Video data for modified heist scene |
| Paitning of a village | Impressionism style | Video data for heist scene | Position data for artwork | Video data for modified heist scene |
| Paitning of a village | Photorealism style | Video data for heist scene | Position data for artwork | Video data for modified heist scene |
| Paitning of a village | Impressionism style | | Duration data | Video data for heist scene |
| Painting of a landscape | | | Duration data | Video data for heist scene |
| ... | ... | ... | ... | ... |

CONTENT SYSTEM WITH USER-INPUT BASED VIDEO CONTENT GENERATION FEATURE

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, an example method is described. The method includes (i) obtaining a first segment of video content; (ii) outputting for presentation, the obtained first segment; (iii) after outputting for presentation the obtained first segment, causing a user to be prompted for user-input data; (iv) receiving user-input data provided in response to the prompting; (v) using at least the received user-input data to synthetically generate a second segment of the video content, wherein the generated second segment is static, non-interactive content; and (vi) outputting for presentation, the generated second segment.

In another aspect, an example computing system is described. The computing system is configured for performing a set of acts including (i) obtaining a first segment of video content; (ii) outputting for presentation, the obtained first segment; (iii) after outputting for presentation the obtained first segment, causing a user to be prompted for user-input data; (iv) receiving user-input data provided in response to the prompting; (v) using at least the received user-input data to synthetically generate a second segment of the video content, wherein the generated second segment is static, non-interactive content; and (vi) outputting for presentation, the generated second segment.

In another aspect, a non-transitory computer-readable medium is described. The non-transitory computer-readable medium has stored thereon program instructions that upon execution by a computing system, cause performance of a set of acts. The set of acts include (i) obtaining a first segment of video content; (ii) outputting for presentation, the obtained first segment; (iii) after outputting for presentation the obtained first segment, causing a user to be prompted for user-input data; (iv) receiving user-input data provided in response to the prompting; (v) using at least the received user-input data to synthetically generate a second segment of the video content, wherein the generated second segment is static, non-interactive content; and (vi) outputting for presentation, the generated second segment.

DETAILED DESCRIPTION

I. Overview

Given the increasingly large amount of video content (e.g., movies and television shows) that is now available to users, it has become especially important for content providers to provide video content that users find interesting and engaging, so that users will choose that video content over other options. One way to do this is by providing a given user with personalized or otherwise customized video content that is specifically tailored to that user. Among other things, this can provide the user with personalized video content that is generated based on a set of user preferences and/or user selections, such as ones relating to a user's preferred genres, languages, names or word choices, artistic styles, etc.

In some examples, to do this, a content system can present a set of pre-recorded and pre-produced segments of video content to a user, but in a custom order based on input received from the user. Although this provides some level of customization, users may still not find the video content especially interesting or engaging.

The disclosed systems and methods provide an improved approach to presenting customized video content. In one aspect, a content system can generate and present customized video content that includes (i) at least one segment that is pre-recorded and/or pre-produced to help at least partially ground the video content with one or more storylines, themes, characters, etc., and (ii) at least one segment that has been synthetically generated "on the fly" based at least in part on user input provided during or around the time the video content is being presented to provide a customized experience for the user. Among other things, this can help provide the user with customized video content that is specifically tailored to them and that the user finds interesting and engaging. In some instances, the at least one segment that has been synthetically generated can be based on other types of input (beyond user input) as well, such as the user's geographic location, the time of day, current events, etc.

In one example implementation, the content system can do this by obtaining a first segment of video content and outputting for presentation, the obtained first segment. Then, after outputting for presentation the obtained first segment, the content system can cause a user to be prompted for user-input data. The content system can then receive user-input data provided in response to the prompting and use at least the received user-input data to synthetically generate a second segment of the video content, which the content system can output for presentation.

In practice, the user can interact with a user-interface (e.g., a menu-based graphical user-interface) of a television or other content-presentation device, to consider and select a video content template. The video content template can be presented as a "customize the story" or "choose your own path" video content experience or the like. Based at least in part on that selection and other input provided by the user (e.g., at various decision points during presentation of the video content), the content system can obtain, generate, and/or output various segments of video content, to facilitate the content-presentation device presenting the user with customized video content.

In some instances, these segments of video content can be dynamically generated based on a set of user preferences and/or user selections, such as those examples described above. In various examples, the content system can additionally or alternatively leverage one or more machine-learning techniques, such as one that uses a deep neural network (DNN) to facilitate generating the above-described segments of video content. Among other things, this can allow the content system to generate various types of video and/or audio content or other data that can aid in the generation of such content. For instance, the content system can generate images, voice tracks, and/or storylines, as a few examples.

II. Example Architecture

A. Content System

Figure 1:
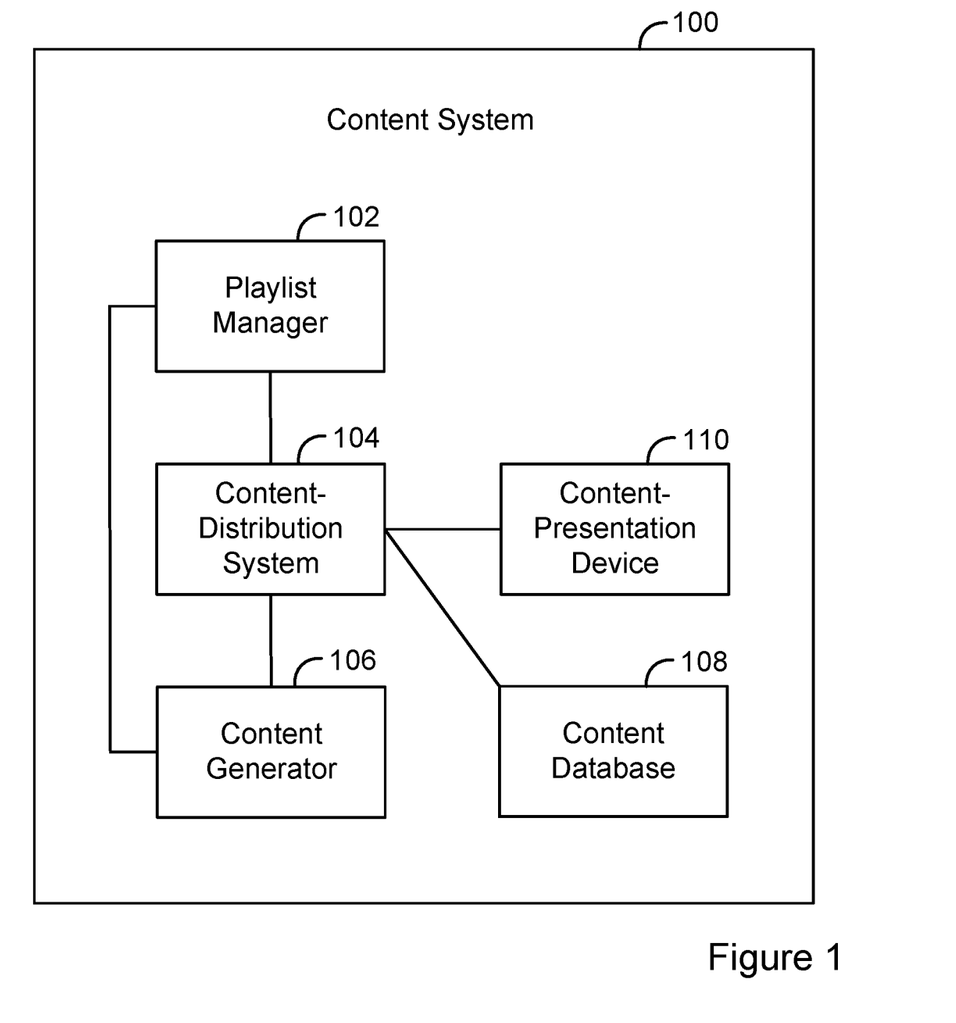
FIG. 1 is a simplified block diagram of an example content system in which various described principles can be implemented.

FIG. 1 is a simplified block diagram of an example content system 100. Generally, the content system 100 can perform operations related to various types of content, such as video content and/or audio content. For context, there can be various types of video content. For example, video content can be or include a movie, a television show, or a commercial, or a portion or combination thereof, among numerous other possibilities.

Video content can be represented by video data, which can be generated, stored, and/or organized in various ways and according to various formats and/or protocols, using any related techniques now know or later discovered. For example, the video content can be generated by using a camera and/or other equipment to capture or record a live-action event. In other example, the video content can be synthetically generated, such as by using one or more of the techniques described in this disclosure, or by using any related video content generation techniques now know or later discovered.

As noted above, video data can also be stored and/or organized in various ways. For example, video data can be stored and organized as a Multimedia Database Management System (MDMS) and/or in various digital file formats, such as the MPEG-4 format, among numerous other possibilities.

The video data can represent the video content by specifying various properties of the video content, such as luminance, brightness, and/or chrominance values, and/or derivatives thereof. In some instances, the video data can be used to generate the represented video content. But in other instances, the video data can be a fingerprint or signature of the video content, which represents the video content and/or certain characteristics of the video content and which can be used for various purposes (e.g., to identify the video content or characteristics thereof), but which is not sufficient at least on its own to generate the represented video content.

In some instances, video content can include an audio content component and/or metadata associated with the video and/or audio content. In the case where the video content includes an audio content component, the audio content is generally intended to be presented in sync together with the video content. To help facilitate this, the video data can include metadata that associates portions of the video content with corresponding portions of the audio content. For example, the metadata can associate a given frame or frames of video content with a corresponding portion of audio content. In some cases, audio content can be organized into one or more different channels or tracks, each of which can be selectively turned on or off, or otherwise controlled.

In some instances, video content (with or without an audio content component) can be made up one or more segments. For example, in the case where the video content is a movie, the video content may be made up of multiple segments, each representing a scene (or perhaps multiple scenes) of the movie. As another example, in the case where the video content is a television show, the video content may be made up of multiple segments, each representing a different act (or perhaps multiple acts) of the show. In various examples, a segment can be a smaller or larger portion of the video content. For instance, a segment can be a portion of one scene, or a portion of one act. Or a segment can be multiple scenes or multiple acts, or various portions thereof.

Returning back to the content system 100, this can include various components, such as a playlist manager 102, a content-distribution system 104, a content generator 106, a content database 108, and a content-presentation device 110. The content system 100 can also include one or more connection mechanisms that connect various components within the content system 100. For example, the content system 100 can include the connection mechanisms represented by lines connecting components of the content system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, a communication (e.g., a transmission or receipt of data) can be a direct or indirect communication.

In some instances, the content system 100 can include multiple instances of at least some of the described components. The content system 100 and/or components thereof can take the form of a computing system, an example of which is described below.

B. Computing System

Figure 2:
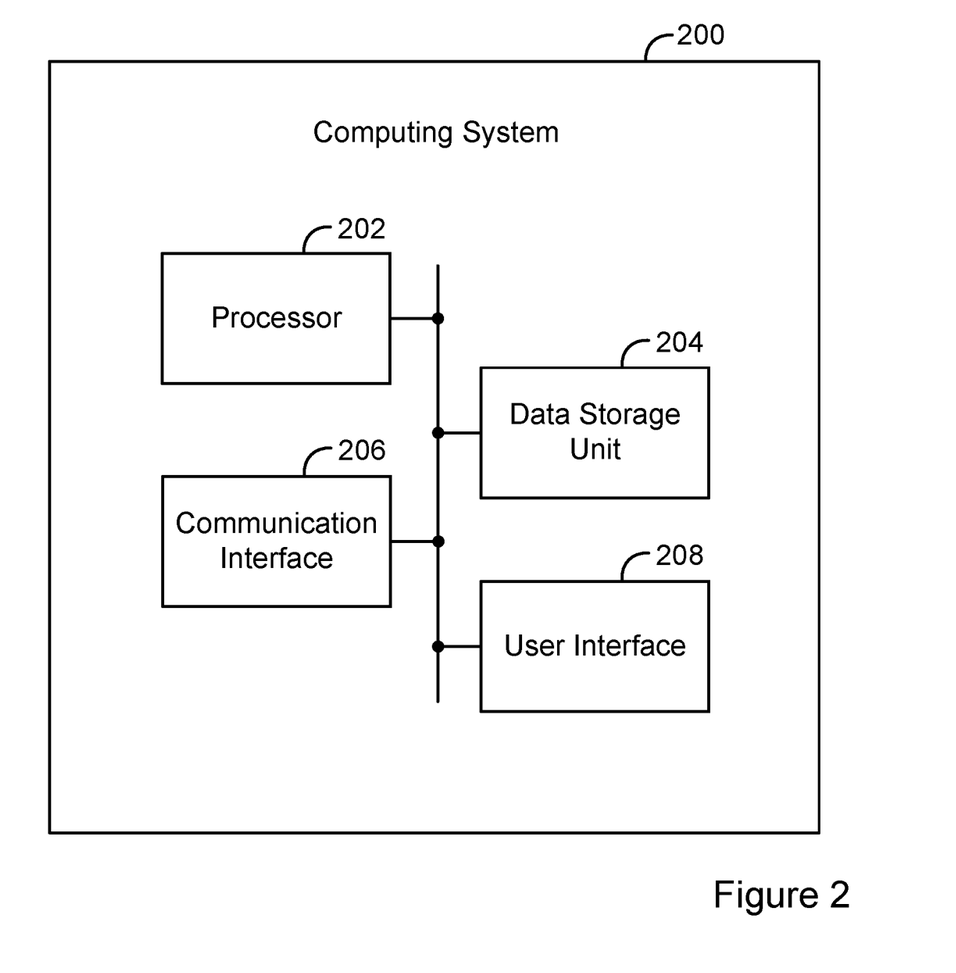
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface, a High-Definition Multimedia Interface (HDMI), or a Universal Serial Bus (USB) interface. In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content system 100 and/or components thereof can take the form of a computing system, such as the computing system 200. In some cases, some or all these entities can take the form of a more specific type of computing system, such as a desktop computer, a laptop, a tablet, a mobile phone, a television, a set-top box, a content streaming stick, a head-mountable display device (e.g., a virtual-reality headset or a augmented-reality headset), or various combinations thereof, among other possibilities.

III. Example Operations

The content system 100 and/or components thereof can be configured to perform and/or can perform one or more operations. As noted above, generally, the content system 100 can perform operations related to various types of content, such as video content and/or audio content. But the content system 100 can also perform other operations. Various example operations that the content system 100 can perform, and related features, will now be described with reference to various figures.

A. Overview

Generally, the content system 100 can obtain, generate, and/or output for presentation by the content-presentation device 110 (e.g., a television, or a set-top box or content streaming stick connected to a television) video content that is customized for a user of the content-presentation device 110 based on input provided by that user. In this way, the user can enjoy customized video content that is specifically tailored to them.

In an example implementation, the video content can include (i) at least some segments that are pre-recorded and/or pre-produced to help at least partially ground the video content with one or more storylines, themes, characters, etc., and (ii) at least some segments that have been selected and/or synthetically generated "on the fly" based at least in part on user input provided during or around the time the video content is being presented to provide a customized experience for the user.

In practice, the user can interact with a user-interface (e.g., a menu-based graphical user-interface) of the content-presentation device 110, to consider and select a video content template. The video content template can be presented as a "customize the story" or "choose your own path" video content experience or the like. Based at least in part on that selection and other input provided by the user (e.g., at various decision points during presentation of the video content), the content system 100 can obtain, generate, and/or output various segments of video content, to facilitate the content-presentation device 110 presenting the user with customized video content.

B. Obtaining and Outputting a First Segment of Video Content

To begin, the content system 100 can obtain a first segment of video content. In one example, the content system 100 can obtain the first segment based on user-input data received from the content-presentation device 110.

In practice, a user of the content-presentation device 110 can interact with a user-interface (e.g., a menu-based graphical user-interface) of the content-presentation device 110, to consider and select one of various video content templates. For example, the user can select a video content template with the title "ART HEIST MOVIE (WITH CUSTOMIZATION)." As such, the content-presentation device 110 can receive user input data indicating this selection (e.g., in the form of a video content template ID), which the content-presentation device 110 can transmit to the playlist manager 102.

The playlist manager 102 can then receive the user-input data and use it to obtain a corresponding playlist (e.g., from a playlist database that maps video content template IDs to playlists). The playlist can specify one or more segments, placeholders, decision-point markers, or other information that helps guide creation of customized video content. The playlist can specify this information in various ways. For example, the playlist can specify a segment in the form of a segment ID, perhaps along with other related information, such as a start time, duration, and/or other timing information. Likewise, the playlist can specify a placeholder with a placeholder ID, along with metadata to facilitate generation of a segment that is intended to be inserted into the placeholder. This metadata can include a decision-point marker (e.g., in the form of a decision-point ID) and information about options that may be offered to a user in connection with that decision point, such as a set of user-selectable options, for instance. The playlist can also specify other information, such as timing information, including any of the types noted above. Similarly, the playlist can specify In one example, the content system 100 can use the playlist to obtain the first segment. More specifically, the playlist manager 102 can use the playlist to obtain a segment ID of the first segment. The playlist manager 102 can then transmit the segment ID to the content-distribution system 104 and instruct the content-distribution system 104 to use the segment ID to retrieve the first segment from the content database 108.

As noted above, the customized video content can include at least some segments that are pre-recorded and/or pre-produced to help at least partially ground the video content with one or more storylines, themes, characters, etc. As such, in one example, the first segment can be a live-action video recording. For instance, in the case of the art heist movie example, the first segment can be an opening set of scenes of the movie that starts off the story, establishes the general setting of the movie, and that introduces some key characters.

In some examples, the playlist can identify a set of options for the first segment, and the content system 100 can use user-preference information and/or other input to facilitate the selection of a given one of those options. In other examples, the playlist can identify certain criteria for the first segment, and the content system 100 can use user-preference information and/or other input to facilitate a selection of a given first segment that meets that criteria. Among other things, this can allow the content system 100 to use user-preference information and/or other input to automatically select a suitable first segment. For example, in the case where the user-preference information indicates a preference of a given genre, art style, actor/actress, etc., the content system 100 can leverage that information to automatically select a first segment in line with the user's preferences.

After the content system 100 obtains the first segment, the content system 100 can output for presentation the first segment. In one example, this can include the content-distribution system 104 transmitting the first segment to the content-presentation device 110, which can receive and itself output for presentation the first segment, such that it can be viewed by a user. In some instances, the playlist manager 102 can use timing information (e.g., a start time, etc.) in the playlist to coordinating the timing of the output.

The content-distribution system 104 can transmit video content on one or more channels (sometimes referred to as stations or feeds). As such, the content-distribution system 104 can be associated with a single channel content distributor or a multi-channel content distributor such as a multi-channel video program distributor (MVPD).

The content-distribution system 104 and its means of transmission of video content on the channel to the content-presentation device 110 can take various forms. By way of example, the content-distribution system 104 can be or include a cable-television head-end that is associated with a cable-television provider and that transmits the video content on the channel to the content-presentation device 110 through hybrid fiber/coaxial cable connections. As another example, the content-distribution system 104 can be or include a satellite-television head-end that is associated with a satellite-television provider and that transmits the video content on the channel to the content-presentation device 110 through a satellite transmission. As yet another example, the content-distribution system 104 can be or include a television-broadcast station that is associated with a television-broadcast provider and that transmits the content on the channel through a terrestrial over-the-air interface to the content-presentation device 110. And as yet another example, the content-distribution system 104 can be an Internet-based distribution system that transmits the video content using a video content streaming-type service or the like to the content-presentation device 110.

In these and other examples, the content-distribution system 104 can transmit the content in the form of an analog or digital broadcast stream representing the video content.

The content-presentation device 110 can receive video content from one or more entities, such as the content-distribution system 104. In one example, the content-presentation device 110 can select (e.g., by tuning to) a channel from among multiple available channels, perhaps based on input received via a user interface, such that the content-presentation device 110 can receive video content on the selected channel.

In some examples, the content-distribution system 104 can transmit video content to the content-presentation device 110, which the content-presentation device 110 can receive. The content-presentation device 110 can also output video content for presentation. As noted above, the content-presentation device 110 can take various forms. In one example, in the case where the content-presentation device 110 is a television set (perhaps with an integrated set-top box and/or streaming media stick), outputting the video content for presentation can involve the television set outputting the video content via a user interface (e.g., a display device and/or a sound speaker), such that it can be presented to an end-user. As another example, in the case where the content-presentation device 110 is a set-top box or a streaming media stick, outputting the video content for presentation can involve the set-top box or the streaming media stick outputting the video content via a communication interface (e.g., an HDMI interface), such that it can be received by a television set and in turn output by the television set for presentation to an end-user.

As such, in various scenarios, the content-distribution system 104 can transmit video content to the content-presentation device 110, which can receive and output the video content for presentation to an end-user.

C. Prompting for and Receiving User-Input Data

After outputting for presentation the obtained first segment, the content system 100 can cause a user to be prompted for user-input data. To facilitate this, the playlist manager 102 can detect metadata associated with the first segment and/or an upcoming second segment, where the metadata specifies information about a prompt and/or a set of user-selectable options. In some instances, the playlist manager 102 can also transmit to the content-distribution system 104, other information obtained from the playlist, to allow the content-distribution system 104 to embed that information in, or otherwise associate that information with, the first content. The content-presentation device 110 can then receive this set of user-selectable options and can present it to the user, such as by way of a graphical user-interface or the like.

Figure 3:
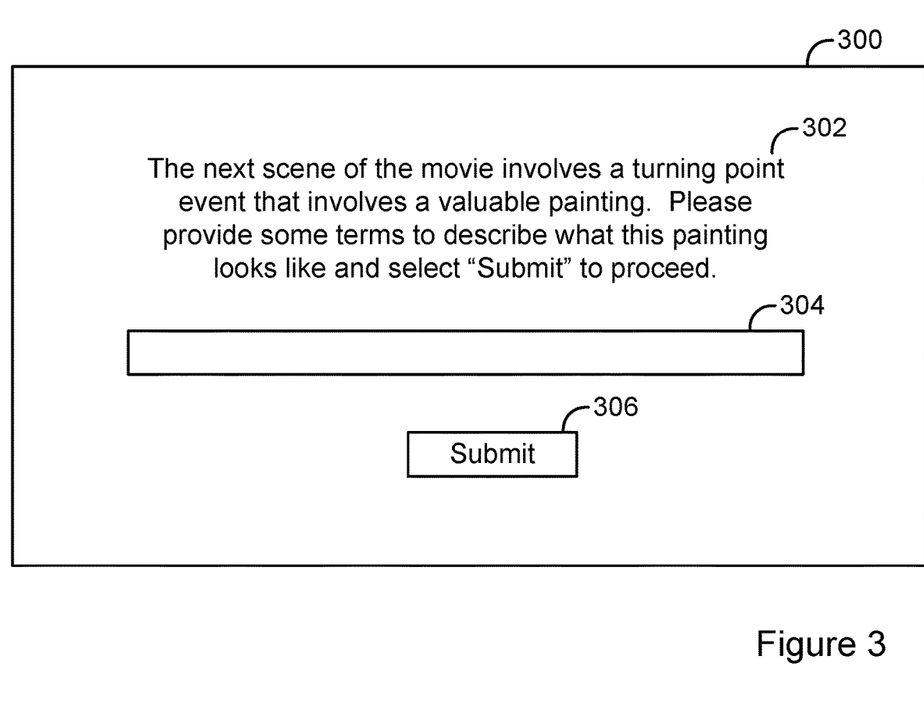
FIG. 3 is a diagram of example prompt for user-input data, according to an example embodiment.

As one example, the metadata can specify a prompt in the form of a text box asking the user to provide certain input. For instance, returning to the example involving the art heist movie, and as shown in FIG. 3, a prompt 300 could have a message 302 saying "The next scene of the movie involves a turning point event that involves a valuable painting. Enter some terms to describe what this painting looks like." and could be followed by a text box 304. This could allow the user to enter one or more terms in the text box 304. For example, the user could enter terms such as "a painting of a landscape in the style of impressionism."

Figure 4:
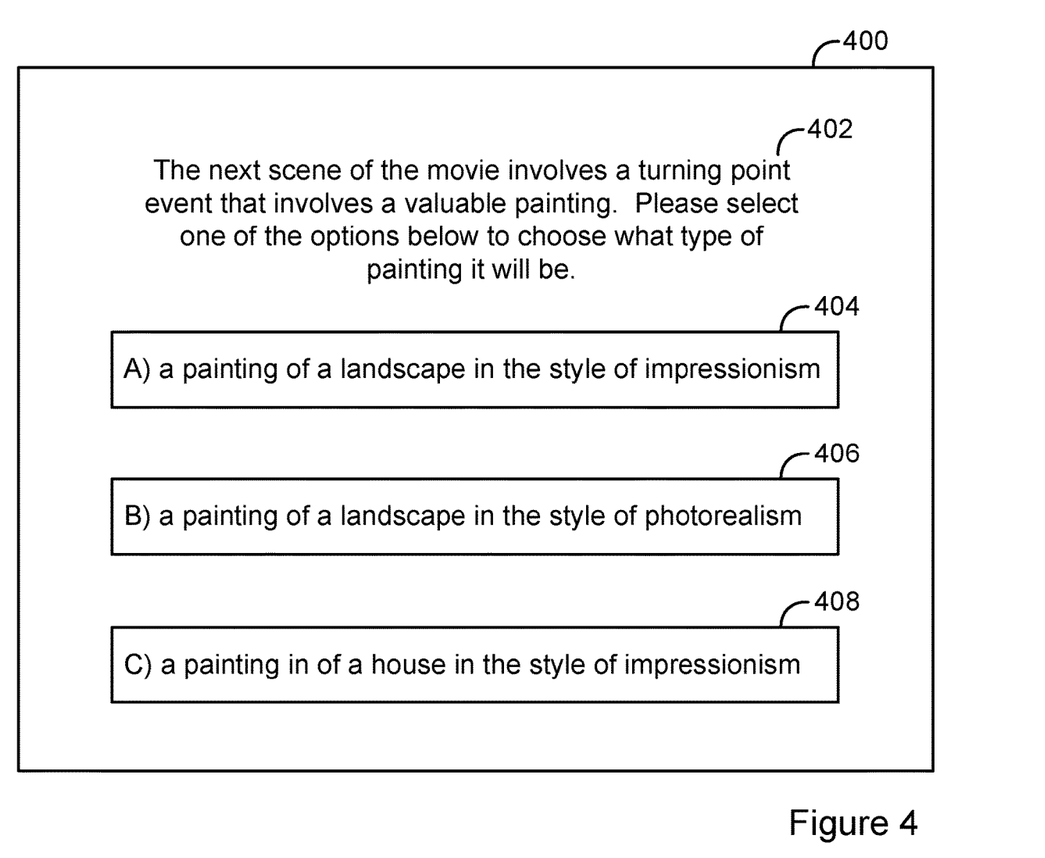
FIG. 4 is a diagram of another example prompt for user-input data, according to an example embodiment.

In another example, the metadata can specify a prompt similar to the last one, except that instead of providing a text box, the prompt could present a set of selectable options. For instance, staying with the example involving the art heist movie, and as shown in FIG. 4, a prompt 400 could have a message 402 saying "The next scene of the movie involves a turning point event that involves a valuable painting. Please select one of the options below to choose what type of painting it will be." The prompt could then present a set of selectable options, namely a first option 404 of "A) a painting of a landscape in the style of impressionism," a second option 406 of "B) a painting of a family in the style of impressionism," and a third option 408 of "C) a painting of a house in the style of impressionism."

Although an example prompt has been described above, it should be understood that the prompt could be configured in lots of different ways. For example, rather than each selectable option being a text-based description of a style of a painting, the selectable option could instead be an image of a painting depicting a given subject in a given art style. Or perhaps, the set of selectable options could be images of different subjects of a painting, paired with another set of selectable options that are images of paintings in different art styles, such that the user can select an image in each set, to indicate a selection of a subject and a selection of an art style. In some cases, the one or more prompts could be configured using prompt engineering to link one or more prompts together. Thus, for example, after the user selects an image of a given art subject, the content system could then present a set of images showing that art subject in various different art styles, such that the user could make another selection. Text-based prompts could likewise be configured using prompt engineering techniques or the like.

Additionally or alternatively, the set of selectable options could have an "other" option, where the user is able to provide free-form entry (e.g., by way of text and/or voice input, for instance). This could allow the user to provide input that is not provided in the set selectable options, for example. Many other prompt variations are possible as well.

In some cases, rather than specifying particular options, the metadata can instead specify the types of options that could be presented, for example options of different types of painting subjects, styles, etc., and the content system 100 could use one or more other sources of data to determine which specific set of user-selectable options are to be presented. In some examples, randomization can be used in the process of determining which options to present to the user. This can help ensure that different users have different experiences, even if all input, etc. is the same.

As one example, the content system 100 can determine user-profile data associated with the user, and can use the determined user-profile data to determine at least one option in the set of user-selectable options. As such, causing the user to be prompted for input-data can involve causing presentation of a set of user-selectable options based on the user-profile data. For example, continuing with the art heist movie example, the content system 100 could analyze user profile data associated with the user (e.g., provided that the user has explicitly provided permission for this data to be used for this purpose) to determine various types of artwork that the user enjoys, and could use that information to populate a set of options of different subjects/styles of paintings, for instance. In this way, the content system 100 can provide the user with one or more options that are tailored to the user's interests.

As another example, the content system 100 can detect the occurrence of a real-time event occurring proximate (i.e., at or near—perhaps within a day, week, or month, as desired) a time point at which the first segment is output for presentation, and can use the detected event to determine at least one option in the set of user-selectable options. For example, continuing with the art heist movie example, the content system 100 could detect a real-time event occurring around that time, such as the occurrence of as an auction of famous pieces of artwork occurring around that time, or a news story about a given artist, and could use information about the types of pieces of artwork being auctioned or that were created by the given artist, to populate a set of options of these or similar types of paintings, for instance. The content system 100 can detect the occurrence of such an event by analyzing various news feeds or the like, perhaps with some search terms based on terms included in the metadata, as noted above. In this way, the content system 100 can provide the user with one or more options that are based on real-world events in a way that may be provide a fun experience for the user.

As yet another example, the content system 100 can crowdsource user input-data provided in response to prompting associated with multiple other instances of the first segment being presented to other users. As such, the content system 100 can consider what one or more other users are entering and/or selecting in connection with similar prompts, and can use that information to determine one of more of the options to be presented to the user. For instance, in the case where other users are routinely entering certain search terms, the content system 100 can recognize this and based on detecting this, the content system 100 can include such terms as one of the selectable options. In this way, the content system 100 can present options that tend to be popular with other users.

In addition to the metadata associated with the first segment specifying a type of prompt and/or a set of user-selectable option, the metadata can also specify a time point at which the content-presentation device 110 is to prompt the user. In some instances, the metadata could specify some time point in the middle of the first segment, or perhaps a time point that is the very end of the first segment, such that the prompting is performed after the first segment is output for presentation (and before a next segment is output for presentation).

After the content system 100 causes the user to be prompted for user-input data, the content system 100 can then receive user-input data provided in response to the prompting. In one example, this can involve the content-presentation device 110 receiving text input into a presented text box or a selection from the presented set of user-selectable options and transmitting an indication of the input or selection to the playlist manager 102. The user can provide such input in various ways, such as by pressing buttons, or by issuing voice or gesture commands, for example. Such voice commands could be captured by a microphone, and such gesture commands could be captured by a camera, either of which could be or could be included in a connected IoT device, a content-presentation device (e.g., a television), or a mobile device (e.g., a smartphone), among numerous other possibilities.

D. Generating and Outputting a Second Segment of Video Content

After the content system 100 receives user-input data provided in response to the prompting, the content system 100 can then use at least the received user-input data to synthetically generate a second segment of the video content (perhaps in the form of video data representing the segment). In some cases, the content system 100 can alternatively or additionally receive and/or use other data in connection with synthetically generate the second segment. For example, the content system 100 can receive and/or use user-input data, user-profile data, video data, and/or associated metadata, or any combinations thereof, to synthetically generate the second segment.

The content system 100 can use such data to synthetically generate the second segment in various ways. As one example, the content generator 106 can do so by employing a machine learning technique, such as one that uses a deep neural network (DNN) or a diffusion model to train a model to use user-input data, user-profile data, video data, and/or associated metadata, as runtime input-data to generate a segment of video content as runtime output-data (perhaps in the form of video data representing the segment).

Notably though, before the content generator 106 uses a model to analyze the runtime input-data to generate the video segment, the content generator 106 can first train the model by providing it with training input-data and training output-data. The training-input data can include user-input data, user-profile data, video data, and/or associated metadata, and the training output-data can include video data representing a segment.

Starting with the training input data, as noted above, this can include user-input data. For example, this could include text such as "Painting of a landscape." In some instances, the training input-data can include user-profile data. For example, this could include an art style preference in the form of text, such as "impressionism style."

In some instances, the training input-data can include video data and/or associated metadata. For example, this could include video data representing an input segment of video content that includes a depiction of (or a placeholder for) a piece of artwork, and this could further include metadata that specifies where within that segment is the depiction (or placeholder for) the piece of artwork. For instance, the metadata can specify regions (perhaps identified by coordinates, pixels, etc.) of one or more frames of the input segment.

Moving on to the training output data, as noted above, this can include video data representing an output segment of video content. For example, the output segment can be a modified version of the input segment, namely one that is the same except where the depiction of (or placeholder for) the piece of artwork is replaced with different artwork, namely a painting of a landscape in the style of impressionism. Lots of other types of training data can be provided to the model as well.

Figure 5:
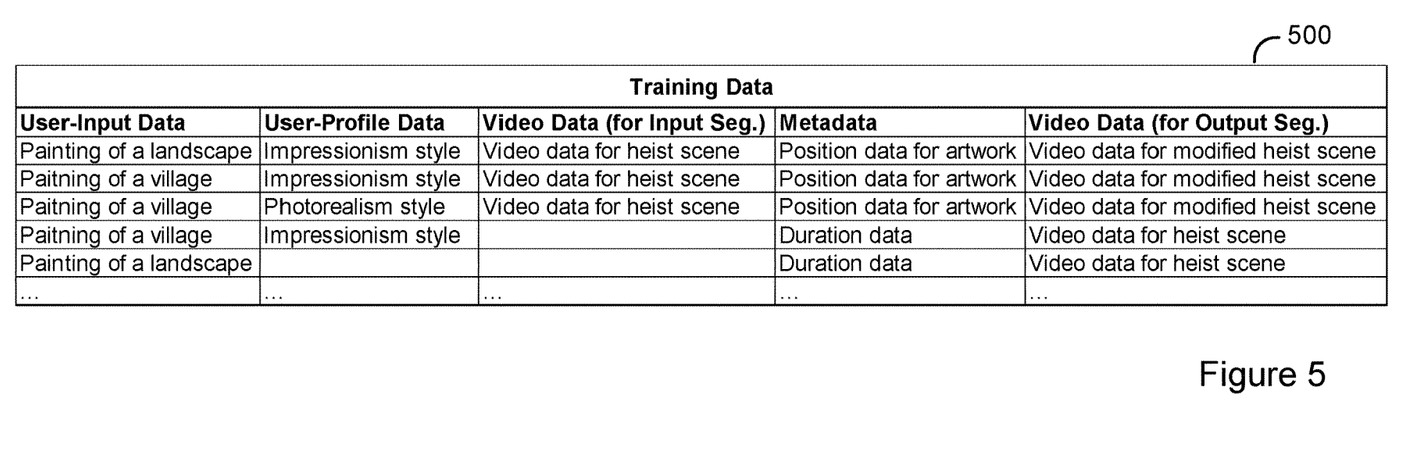
FIG. 5 is a diagram of example training data for use in training a model that uses as input data to generate corresponding output data.

FIG. 5 illustrates example training data 500. As shown, the training data includes multiple training data sets (each represented as a separate row in the table), each of which includes user-input data, user-profile data, video data (for the input segment), and/or associated metadata, as training input-data, and corresponding video data (for the output segment) as training output-data.

In line with the example discussed above, in a first example set of training data, the training input-data can include user-input data that includes the text "Painting of a landscape," user-profile data that includes the text "impressionism style," video data representing an input segment of a heist scene that includes a depiction of a piece of artwork, and metadata specifying position data for the artwork, perhaps in the form of coordinates, pixels, etc. of one or more frames of the input segment corresponding to the depiction of the piece of artwork. The training output-data can include video data representing an output segment that is a modified version of the input segment that is the same except where the depiction of the piece of artwork is replaced with different artwork, namely a painting of a landscape in the style of impressionism.

Likewise, in a second example set of training data, the training input-data can include user-input data that includes the text "Painting of a village," user-profile data that includes the text "impressionism style," and input segment video data and metadata that is the same as in the first set of training data. The training output-data can include video data representing an output segment that is a modified version of the input segment that is the same except where the depiction of the piece of artwork is replaced with different artwork, namely a painting of a village in the style of impressionism.

In a third example set of training data, the training input-data can include user-input data that includes the text "Painting of a village," user-profile data that includes the text "photorealism style," and input segment video data and metadata that is the same as in the first set of training data. The training output-data can include video data representing an output segment that is a modified version of the input segment that is the same except where the depiction of the piece of artwork is replaced with different artwork, namely a painting of a village in the style of photorealism.

In a fourth example set of training data, the training input-data can include user-input data that includes the text "Painting of a village," user-profile data that includes the text "impressionism style," without any input segment video data, but with metadata that specifies an intended duration of a video segment to be generated and other data about the type of scene (e.g., an indication that the scene is a heist scene). The training output-data can include video data representing an output segment that is a generated segment of a heist scene that includes a depiction of the piece of artwork, namely a painting of a village in the style of photorealism, and that has the intended duration.

Additional training data sets (for the same or different types of input data), such as the additional example training data sets shown as part of the example training data 500, can be used to train or further train the model. In practice, it is likely that large amounts of training data—perhaps thousands of training data sets of more—would be used to train the model as this generally helps improve the usefulness of the model. Training data sets can include a wide variety of different types of data, combinations of data, etc. to allow for many different types of video segments (with many different kinds of customization) to be generated by the trained model. For example, in line with the art subject and art style example provided above, a model could be trained with lots of different art subject and art styles, thereby allowing for the generation of output associated with video associated with lots of different art subject and/or art styles.

Training data can be generated in various ways, including by being manually assembled. However, in some cases, the one or more tools or techniques, including any training data gathering or organization techniques now known or later discovered, can be used to help automate or at least partially automate the process of assembling training data.

In some cases, the model can be at least partially user-specific and as such, the training data used for the model can likewise be at least partially user-specific. In other words, user preference information or other data associated with a user profile can be used to select training data for the model. This can allow the model to be a personalized model that is configured to generate output for that specific user. For example, in the case where a user watches many animated movies that have a given art style, the model can be trained to generate video data representing video in that art style.

Many other examples are possible. As such, based on user preference information, user-specific training data can be used to train the model so that the model can generate data representing video with certain subjects, styles, etc. that the user prefers.

After the model is trained, the playlist manager 102 can then provide to the model runtime input data, which the model can use to generate runtime output data. Generally, the runtime input data is of the same type (or perhaps a portion thereof) as the training input data as described above.

Returning to the example of the art heist movie, recall that based on the playlist, the content system 100 can obtain and output a first segment that is an opening set of scenes of the movie that starts off the story, establishes the general setting of the movie, and that introduces some key characters. The playlist can specify some details of the next segment that is to follow, while allowing that segment to be generated in a way that it includes those details, but that it also customized based on user-input data, etc. For instance, the playlist could refer to a segment that includes a scene of an art heist, but where the piece of artwork that is the subject of the scene can be customized based on user-input data. To provide for this customization, the content generator 106 can then use the data from the playlist, together with the user-input data, to generate the second segment, such as by using a trained model, as described above.

As such, in a first runtime example, the runtime input-data (which could be different from the video content used to train the model) can include user-input data that includes the text "Painting of a landscape," user-profile data that includes the text "impressionism style," video data representing an input segment of a heist scene that includes a depiction of a piece of artwork, and metadata specifying regions of frames of the input segment corresponding to the depiction of the piece of artwork. The model can then use this runtime input data to generate runtime output data, which is of the same type as the output data as described above.

As such, continuing with the first runtime example, the runtime output data can include corresponding video data representing an output segment that is a modified version of the input segment, that is the same except where the depiction of the piece of artwork is replaced with different artwork, namely a painting of a landscape in the style of impressionism.

Thus, more generally, responsive to the content generator 106 providing the runtime input-data to the trained model, the content generator 106 can receive from the trained model, corresponding runtime output-data, namely video data representing a segment of video content that is based on that runtime input-data.

As such, in one example, the content generator can provide the received user-input data and/or other data to a trained model, wherein the trained model is configured to use the user-input data and/or other data as runtime input-data to generate a segment of video content as runtime output-data. And responsive to providing the user-input data and/or other data to the trained model, the content generator 106 can receive from the trained model, corresponding video data representing a generated segment of video content.

In some examples, the content system 100 can additionally or alternatively use user-preference information and/or other input to facilitate generating the second segment. Among other things, this can allow the content system 100 to use user-preference information and/or other input to automatically generate a suitable second segment (with or without consideration of user-input data). For example, in the case where the user-preference information indicates a preference of a given genre, art style, actor/actress, etc., the content system 100 can leverage that information (with or without user-input data) to automatically generate a second segment in line with the user's preferences.

In this way, the content generator 106 can use user-input data and/or other data to generate a corresponding video segment to be used in connection with the customized video content. The content generator 106 can then store that generated second segment in the video database 108, so that it can be accessed by the content-distribution system 104, for instance.

It should be noted that in some cases, the specific types of training data and/or runtime data can include some or all of the different components described above, and perhaps other component as well. Also, the model, the training data, and the runtime data can be stored in and/or operation within, the content generator 106 or the content database 108, for instance.

After the content system 100 generates the second segment, the content system 100 can output for presentation the generated second segment. As with the first segment, in one example, this can include the content-distribution system 104 transmitting the second segment to the content-presentation device 110, which can receive and present the second segment, such that it can be viewed by a user. In some instances, the playlist manager 102 can cause the content-distribution system 104 to do this, can use timing information in the playlist to coordinating the timing of the output.

Although the overall video content can be interactive in the sense that a user can provide user-input data which is used to customize the video content, in some instances, one or more video segments can be static, non-interactive content. For instance, it can be the case that the second segment, while it may be synthetically generated "on the fly," can itself be static, non-interactive content.

E. Additional Segments of Video Content

In practice, the customized video content is likely to have many more segments, which can be obtained, generated, and/or outputted for presentation using the same or similar techniques those described above in connection with the first segment and the second segment. Indeed, a playlist can specify many different segments and/or placeholders for segments, with corresponding metadata, decision-point markers, etc., such that the content system 100 can repeatedly obtain and/or generate content segments in the ways described above. For instance, after outputting the second segment, the content system 100 can obtain, generate, and/or and output for presentation one or more additional segments in accordance with the playlist, some of which may be pre-recorded or pre-produced, and some of which may be synthetically generated, such as by using the techniques as described above. For instance, continuing with the art heist movie example, after outputting the second segment, which involves a scene of an art heist, the content segment 100 can obtain and/or generate additional segments (perhaps many) to be output, to complete the movie.

As noted, some of these additional segments can be pre-recorded or pre-produced segments that help define the overall structure of the story, whereas there also may be some segments where it is desirable to synthetically generate them on the fly to provide a customized experience. For instance, for any additional segments that include a depiction of the piece of artwork that is the subject of the heist, it may be desirable to have those segments be synthetically generated to provide consistency with the second segment where that piece of artwork was first introduced, whereas it may be desirable for other segments to be pre-recorded or pre-produced segments.

It should be noted that in other example implementations, the extent of customization can be much more significant, as compared to the movie heist example, which was provided as just one illustrative example. For instance, in connection with the user providing user-input data to the content system 100, the user can provide many different types and examples of input. As a few examples, a user could provide information about the general setting, such as a time period or a geographic location; character information, such as a character name, personality traits, clothing style preferences; object information, such as a type of cars to appear in a scene; a content genre or art style; or a language preference, among numerous other possibilities. The user could also provide input related to the plot or storyline, so as to guide the story down a given path. In this context, the user could choose what happens next in the story, who it happens to, where it happens, etc.

With this user-input data (and other data as described above), the content generator 106 can generate a variety of different types of segments, to facilitate generating customized video content. For example, the content generator 106 can generate segments with customized background, characters, objects, etc. In some cases, an audio content component (e.g., background music or a character's voice) of a video segment can be customized in the same or in a similar way.

As noted above, by allowing a user to provide input at different decision-making points, and using at least this input to generate segments of the video content, it is possible that a user could cause the video content to follow one or more different segment paths.

Figure 6:
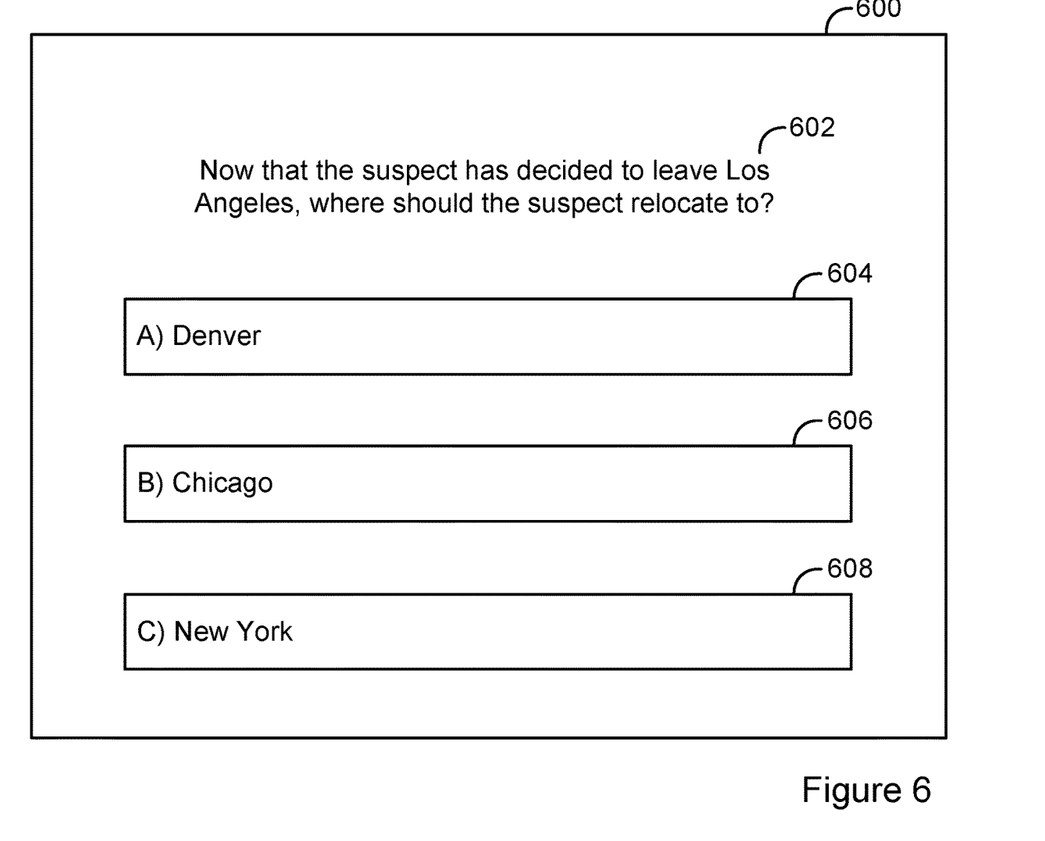
FIG. 6 is a diagram of another example prompt for user-input data, according to an example embodiment.

For instance, staying with the example involving the art heist movie, and as shown in FIG. 6, a prompt 600 could have a message 602 saying "Now that the suspect has decided to leave Los Angeles, where should the suspect relocate to?" The prompt could then present a set of selectable options, namely a first option 604 of "A) Denver," a second option 606 of "B) Chicago," and a third option 608 of "C) New York."

Figure 7:
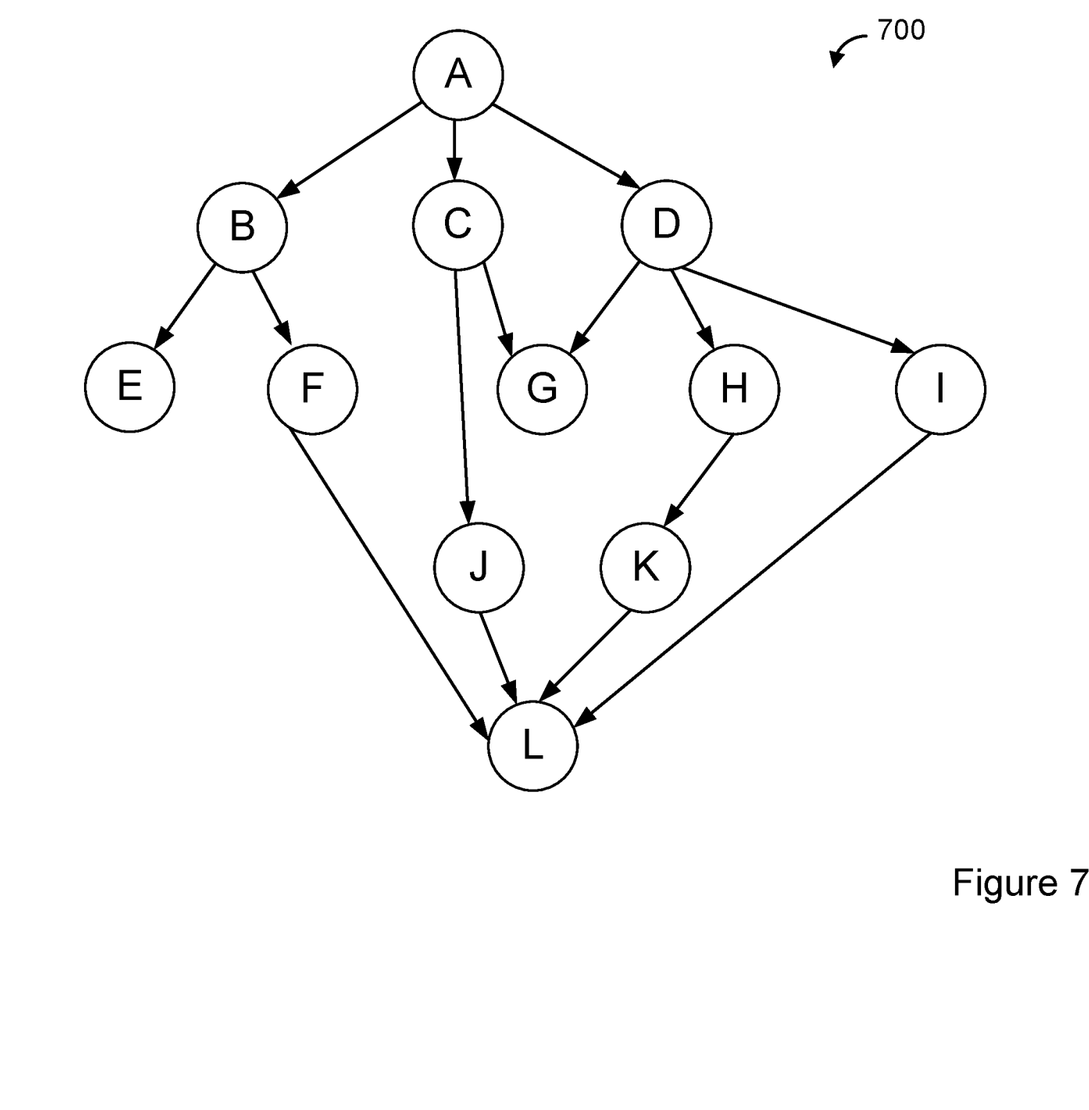
FIG. 7 is a simplified block diagram of example segment path.

FIG. 7 show a graph 700 representing the various possible path options for a given video content template. Each node represents a segment, and each arrow represents one or more possible segments that could follow in a given path. As the user views the video content (and provides user-input data in response to prompting), the content system 100 can obtain and/or generate segments as appropriate, thereby generating video content that follows a given path. For instance, the node A could represent the first segment, where the video content starts. From there, depending on a selection made by the user (provided in the form of user-input data), the path can proceed to either node B, C, or D. This process can then repeat itself as the user provides user-input data, thereby causing the content system 100 to generate customized video according to a given path, eventually ending at nodes E, G, or L, for example.

In some instances, in connection with causing the user to be prompted for user-input data, the content system 100 can cause presentation of historical data indicating a history of (i) user input-data received in connection with the video content and (ii) segments synthetically generated in connection with the video content. In one example, the content system 100 can present this information by presenting a graph such as the graph 700, perhaps with other related information, such as an indication of the user-input data provided at each decision point and/or information about each segment referenced in the graph 700. Among other things, providing this information can help a user appreciate the path that has been taken so far (which may help a user decide which selections to make going forward).

F. Editing Interface/Production Tool

In some cases, the content system 100 can output a segment graph, such as the graph 700, as part of a video content editing interface, which can allow the user to view the path and related information, and also to modify user-input data provided along the way. As such, in one example, the user could use the interface to select a given node, and edit the user-input data previously provided at that stage. This can result in the content system re-generating one or more segments, in line with the revised user-input data. Thus, for example, after outputting for presentation, the second segment, the content system 100 can provide a video content editing interface that facilitates (i) outputting for presentation historical data indicating (a) a history of user input-data received in connection with the video content and (b) video segments synthetically generated in connection with the video content, (ii) editing at least a portion of the received user input-data, and (iii) based on the edited user input-data, regenerating one or more corresponding segments of the video content.

In this way, the video content editing interface can serve as a production tool that can provide the user with the ability to test out different user-input data, etc., to see how the customized video content is impacted, perhaps with the ability to save one or more different generated paths (and the corresponding customized video content). To further assist the user, the content system can use one or more scoring technique (based on predefined rules that analyze plot consistency, integrity, etc.) to score a given path. As such, the video content editing interface can further facilitates determining and outputting for presentation a score for the video content.

As yet another feature, the content system 100 can facilitate (i) identifying a first portion of the received user input-data that, as compared to a remaining portion of the received user input-data, more greatly influenced characteristics of synthetically-generated segments of the video content, and (ii) outputting for presentation an indication of the identified first portion of the received user input-data. In this way, the content system 100 can help the user appreciate which specific user-input data was especially influential on the generating the video content.

G. Other Arrangements and Related Features and Concepts

Although some of the acts and/or functions described in this disclosure have been described as being performed by a particular entity, the acts and/or functions can be performed by any entity, such as those entities described in this disclosure. For instance, in some embodiments, some or all of the operation described as being performed by a device other than the content-presentation device 110 could instead be performed by the content-presentation device 110 itself.

H. Example Methods

Figure 8:
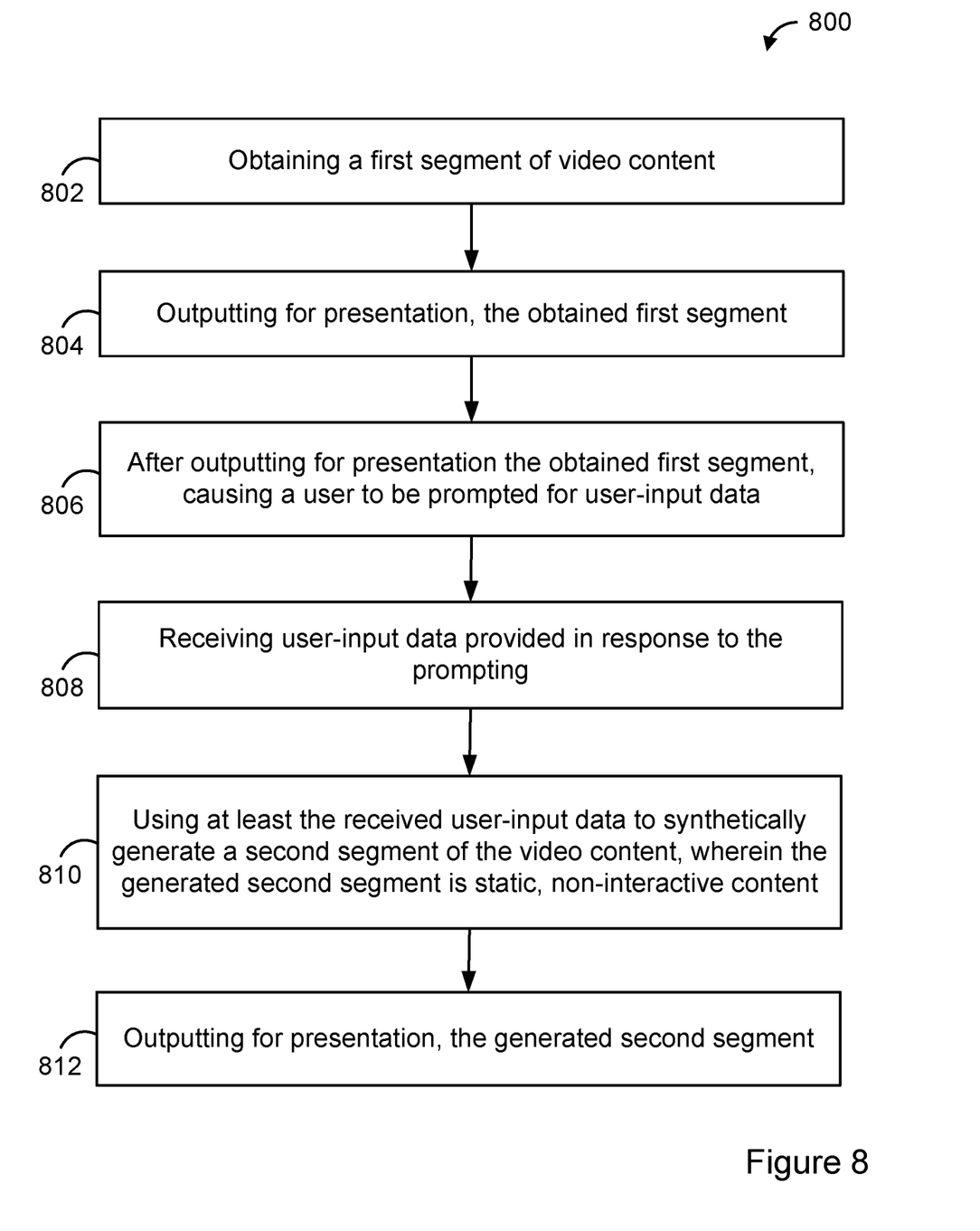
FIG. 8 is a flow chart of an example method.

FIG. 8 is a flow chart illustrating an example method 800. The method 800 can be carried out by a content system, such as the content system 100, or more generally, by a computing system. At block 802, the method 800 includes obtaining a first segment of video content. At block 804, the method 800 includes outputting for presentation, the obtained first segment. At block 806, the method 800 includes after outputting for presentation the obtained first segment, causing a user to be prompted for user-input data. At block 808, the method 800 includes receiving user-input data provided in response to the prompting. At block 810, the method 800 includes using at least the received user-input data to synthetically generate a second segment of the video content, wherein the generated second segment is static, non-interactive content. At block 812, the method 800 includes outputting for presentation, the generated second segment.

Figure 9:
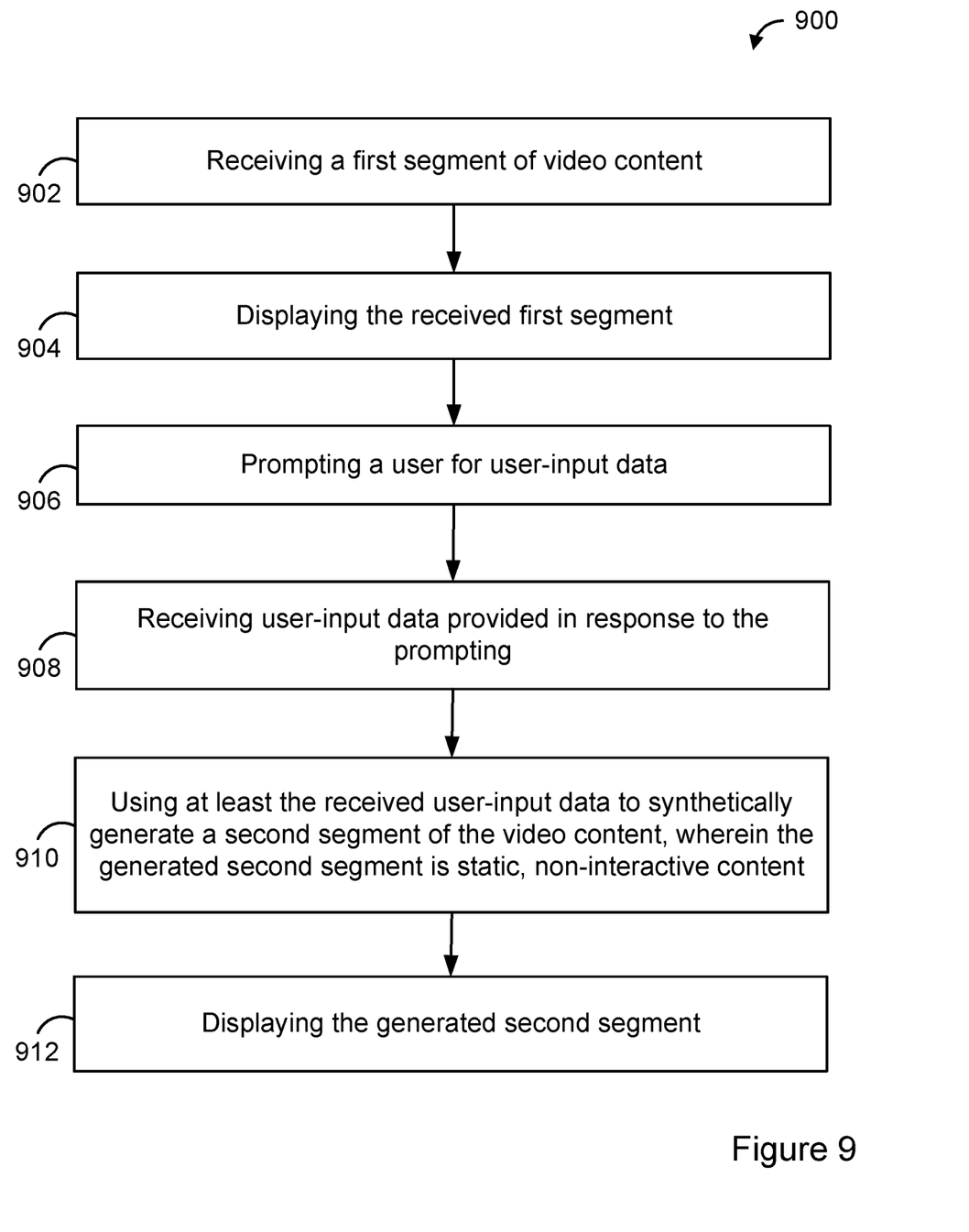
FIG. 9 is a flow chart of another example method.

FIG. 9 is a flow chart illustrating an example method 800. The method 900 can be carried out by a content-presentation device, such as the content-presentation device 110, or more generally, by a computing system. At block 902, the method 900 includes receiving a first segment of video content. At block 904, the method 900 includes displaying the received first segment. At block 906, the method 900 includes prompting a user for user-input data. At block 908, the method 900 includes receiving user-input data provided in response to the prompting. At block 910, the method 900 includes using at least the received user-input data to synthetically generate a second segment of the video content, wherein the generated second segment is static, non-interactive content. At block 912, the method 900 includes displaying the generated second segment.

IV. Example Variations

Although some of the acts and/or functions described in this disclosure have been described as being performed by a particular entity, the acts and/or functions can be performed by any entity, such as those entities described in this disclosure. For example, some or all operations can be performed sever-side and/or client-side. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A method comprising:
   obtaining a first segment of video content;
   outputting for presentation, the obtained first segment;
   after outputting for presentation the obtained first segment, causing a user to be prompted for user-input data;
   receiving user-input data provided in response to the prompting;
   using at least the received user-input data to synthetically generate a second segment of the video content, wherein the generated second segment is static, non-interactive content;
   outputting for presentation, the generated second segment: and
   after outputting for presentation, the second segment, outputting for presentation a video content editing interface that facilitates (i) outputting for presentation historical data indicating (a) a history of user input-data received in connection with the video content and (b) a history of segments synthetically generated in connection with the video content, (ii) editing at least a portion of the received user input-data, and (iii) based on the edited user input-data, re-generating one or more corresponding segments of the video content.

2. The method of claim 1, wherein the first segment is a live-action video recording.

3. The method of claim 1, further comprising:
   detecting metadata associated with the first segment, wherein the metadata specifies a set of user-selectable options, wherein causing the user to be prompted for input-data comprises causing presentation of the set of user-selectable options, and wherein receiving the user input-data provided in response to the prompting comprises receiving a selection from the presented set of user-selectable options.

4. The method of claim 1, further comprising:
   detecting an occurrence of a real-time event occurring proximate a time point at which the first segment is output for presentation, and
   wherein causing the user to be prompted for input-data comprises causing presentation of a set of user-selectable options based on the real-time event, and wherein receiving the user-input data provided in response to the prompting comprises receiving a selection from the presented set of user-selectable options.

5. The method of claim 1, further comprising:
   crowdsourcing user input-data provided in response to prompting associated with multiple other instances of the first segment being presented to other users;
   wherein causing the user to be prompted for input-data comprises causing presentation of a set of user-selectable options based on the crowdsourced user-input data, and wherein receiving the user-input data provided in response to the prompting comprises receiving a selection from the presented set of user-selectable options.

6. The method of claim 1, further comprising:
   in connection with causing the user to be prompted for user-input data, causing presentation of historical data indicating (i) a history user input-data received in connection with the video content and (ii) a history of segments synthetically generated in connection with the video content.

7. The method of claim 1, wherein using at least the received user-input data to synthetically generate the second segment comprises:
   providing at least the received user-input data to a trained model, wherein the trained model is configured to use at least user-input data as runtime input-data to generate video data representing a segment of video content as runtime output-data; and
   responsive to providing the user-input data to the trained model, receiving from the trained model, corresponding video data representing a generated segment of video content.

8. The method of claim 7, wherein the model was trained by providing to the model as training data, multiple training input-data sets, and for each of the training input-data sets, a respective training output-data set;
   wherein each of the training input-data sets includes respective (i) user-input data and (ii) video data and/or associated metadata; and wherein each of the training output-data sets includes a respective segment of video content.

9. The method of claim 1, further comprising:
receiving user-profile data for the user, wherein using at least the received user-input data to synthetically generate the second segment comprises using at least the received user-input data and the received user-profile data to synthetically generate the second segment.

10. The method of claim 1, wherein using at least the received user-input data and the received user-profile data to synthetically generate the second segment comprises:
providing the received user input data and the received user-profile data to a trained model, wherein the trained model is configured to use at least user-input data and user-profile data as runtime input-data to generate video data representing a segment of video content as runtime output-data; and
responsive to providing the user input-data and the user profile-data to the trained model, receiving from the trained model, corresponding video data representing a generated segment of video content.

11. The method of claim 1, wherein the video content editing interface further facilitates determining and outputting for presentation a program score for the video content.

12. The method of claim 11, wherein the video content editing interface further facilitates (i) identifying a first portion of the received user input-data that, as compared to a remaining portion of the received user input-data, more greatly influenced characteristics of synthetically-generated segments of the video content, and (ii) outputting for presentation an indication of the identified first portion of the received user input-data.

13. The method of claim 1, wherein (i) the obtaining the first segment of video content, (ii) the outputting for presentation, the obtained first segment, (iii) the causing the user to be prompted for user-input data, (iv) the receiving user-input data provided in response to the prompting, (v) the using at least the received user-input data to synthetically generate the second segment, and (vi) the outputting for presentation, the generated second segment, are all performed by a computing system that (i) is connected to a content-presentation device, and (ii) facilitates the content-presentation device presenting the video content.

14. The method of claim 13, wherein the content-presentation device is a television.

15. The method of claim 1, wherein (i) the obtaining the first segment of video content, (ii) the outputting for presentation, the obtained first segment, (iii) the causing the user to be prompted for user-input data, (iv) the receiving user-input data provided in response to the prompting, (v) the using at least the received user-input data to synthetically generate the second segment, and (vi) the outputting for presentation, the generated second segment, are all performed by a content-presentation device.

16. The method of claim 15, wherein the content-presentation device is a television.

17. A non-transitory computer-readable medium having stored thereon program instructions that upon execution by a computing system, cause performance of a set of acts comprising:

obtaining a first segment of video content;
outputting for presentation, the obtained first segment;
after outputting for presentation the obtained first segment, causing a user to be prompted for user-input data;
receiving user-input data provided in response to the prompting;
using at least the received user-input data to synthetically generate a second segment of the video content, wherein the generated second segment is static, non-interactive content;
outputting for presentation, the generated second segment, and after outputting for presentation, the second segment, outputting for presentation a video content editing interface that facilitates (i) outputting for presentation historical data indicating (a) a history of user input-data received in connection with the video content and (b) a history of segments synthetically generated in connection with the video content, (ii) editing at least a portion of the received user input-data, and (iii) based on the edited user input-data, re-generating one or more corresponding segments of the video content.

18. The non-transitory computer-readable medium of claim 17, wherein using at least the received user-input data to synthetically generate the second segment comprises:
providing at least the received user-input data to a trained model, wherein the trained model is configured to use at least user-input data as runtime input-data to generate video data representing a segment of video content as runtime output-data; and
responsive to providing the user-input data to the trained model, receiving from the trained model, corresponding video data representing a generated segment of video content.

19. A computing system configured for performing a set of acts comprising:
obtaining a first segment of video content;
outputting for presentation, the obtained first segment;
after outputting for presentation the obtained first segment, causing a user to be prompted for user-input data;
receiving user-input data provided in response to the prompting;
using at least the received user-input data to synthetically generate a second segment of the video content, wherein the generated second segment is static, non-interactive content;
outputting for presentation, the generated second segment; and
after outputting for presentation, the second segment, outputting for presentation a video content editing interface that facilitates (i) outputting for presentation historical data indicating (a) a history of user input-data received in connection with the video content and (b) a history of segments synthetically generated in connection with the video content, (ii) editing at least a portion of the received user input-data, and (iii) based on the edited user input-data, re-generating one or more corresponding segments of the video content.

* * * * *